(12) United States Patent
Li et al.

(10) Patent No.: US 12,245,281 B2
(45) Date of Patent: *Mar. 4, 2025

(54) FREQUENCY DOMAIN RESOURCE ALLOCATION METHOD, TERMINAL, AND NETWORK DEVICE

(71) Applicant: VIVO MOBILE COMMUNICATION CO., LTD., Guangdong (CN)

(72) Inventors: Na Li, Guangdong (CN); Lei Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/412,751

(22) Filed: Jan. 15, 2024

(65) Prior Publication Data
US 2024/0215069 A1    Jun. 27, 2024

Related U.S. Application Data

(63) Continuation of application No. 17/491,674, filed on Oct. 1, 2021, now Pat. No. 11,917,685, which is a (Continued)

(30) Foreign Application Priority Data

Apr. 3, 2019   (CN) .......................... 201910268119.X

(51) Int. Cl.
*H04W 72/044*    (2023.01)
*H04L 27/26*    (2006.01)
(Continued)

(52) U.S. Cl.
CPC ... *H04W 74/0816* (2013.01); *H04L 27/26025* (2021.01); *H04W 72/044* (2013.01); *H04W 74/0866* (2013.01)

(58) Field of Classification Search
CPC .......... H04L 27/26025; H04W 72/044; H04W 74/0866
(Continued)

(56) References Cited

U.S. PATENT DOCUMENTS

2017/0238304 A1   8/2017 Ling et al.
2018/0049203 A1   2/2018 Xue et al.
(Continued)

FOREIGN PATENT DOCUMENTS

CN    106332286 A    1/2017
CN    107370580 A    11/2017
(Continued)

OTHER PUBLICATIONS

Ericsson, "UL signals and channels for NR-U", 3GPP TSG-RAN WG1 Meeting #96bis, R1-1904334, Xi'an, China, Apr. 8-12, 2019.
(Continued)

*Primary Examiner* — Dang T Ton
(74) *Attorney, Agent, or Firm* — Price Heneveld LLP

(57) ABSTRACT

A frequency domain resource allocation method, a terminal, and a network device are disclosed. The method includes: receiving a resource allocation indication, where the resource allocation indication corresponds to a parameter of a BWP configured for the terminal; and determining a frequency domain resource indicated by the resource allocation indication in the BWP.

20 Claims, 5 Drawing Sheets

Related U.S. Application Data continuation of application No. PCT/CN2020/082075, filed on Mar. 30, 2020.

(51) Int. Cl.
*H04W 74/08* (2009.01)
*H04W 74/0816* (2024.01)

(58) Field of Classification Search
USPC .................................... 370/329, 401, 403
See application file for complete search history.

(56) References Cited

U.S. PATENT DOCUMENTS

| | | |
|---|---|---|
| 2018/0192409 A1 | 7/2018 | Yang et al. |
| 2020/0119894 A1 | 4/2020 | Jia et al. |
| 2020/0196289 A1 | 6/2020 | Jia et al. |
| 2023/0114410 A1 | 4/2023 | Jang et al. |
| 2024/0260051 A1* | 8/2024 | Einhaus .............. H04W 72/231 |

FOREIGN PATENT DOCUMENTS

| | | |
|---|---|---|
| CN | 109150374 A | 1/2019 |
| WO | 2018224042 A1 | 12/2018 |
| WO | 2019037610 A1 | 2/2019 |

OTHER PUBLICATIONS

Huawei, "UL channels and signals in NR unlicensed band", 3GPP TSG RAN WGI Meeting #96bis, RI-1903927, Xi'an, China, Apr. 8-12, 2019.

Ericsson, "Feature lead summary for UL Signals and Channels", 3GPP TSG-RAN WG1 Meeting #96, R1-1903338, Athens, Greece, Feb. 25-Mar. 1, 2019.

Lenovo, "UL signals and channels for NR-U", 3GPP TSG RAN WG1#96bis, R1-1904581, Xi'an, China, sth-1 ith Apr. 2019.

Panasonic, NR-U UL signals and channels, 3GPP TSG RAN WG1 #96bis, R1-1904594, Apr. 8-12, 2019, Xi'an, China.

* cited by examiner

FREQUENCY DOMAIN RESOURCE ALLOCATION METHOD, TERMINAL, AND NETWORK DEVICE

CROSS-REFERENCE TO RELATED APPLICATIONS

The present application is a continuation application of U.S. patent application Ser. No. 17/491,674 filed on Oct. 1, 2021, which is a continuation application of International Application No. PCT/CN2020/082075 filed on Mar. 30, 2020, which claims priority of Chinese Patent Application No. 201910268119.X, filed in China on Apr. 3, 2019, all of which are incorporated herein by reference in their entireties.

TECHNICAL FIELD

The present disclosure relates to the field of communications technologies, and in particular, to a frequency domain resource allocation method, a terminal, and a network device.

BACKGROUND

In some communications systems (for example, 5G systems), unlicensed bands (unlicensed band) may be used to supplement licensed bands (licensed band), to help operators expand services. In an unlicensed band, before performing transmission on a configured bandwidth part (BWP), a network device or a terminal also needs to listen on a channel. However, how the network side allocates frequency domain resources in the BWP to the terminal has not been defined, resulting in poor resource allocation accuracy.

SUMMARY

According to a first aspect, some embodiments of the present disclosure provide a frequency domain resource allocation method, applied to a terminal and including:
  receiving a resource allocation indication, where the resource allocation indication corresponds to a parameter of a bandwidth part (bandwidth part, BWP) configured for the terminal; and
  determining a frequency domain resource indicated by the resource allocation indication in the BWP.

According to a second aspect, some embodiments of the present disclosure provide a frequency domain resource allocation method, applied to a network device and including:
  sending a resource allocation indication, where the resource allocation indication corresponds to a parameter of a BWP configured for a terminal, and the resource allocation indication is used to indicate a frequency domain resource in the BWP.

According to a third aspect, some embodiments of the present disclosure provide a terminal, including:
  a receiving module, configured to receive a resource allocation indication, where the resource allocation indication corresponds to a parameter of a BWP configured for the terminal; and
  a determining module, configured to determine a frequency domain resource indicated by the resource allocation indication in the BWP.

According to a fourth aspect, some embodiments of the present disclosure provide a network device, including:
  a sending module, configured to send a resource allocation indication, where the resource allocation indication corresponds to a parameter of a BWP configured for a terminal, and the resource allocation indication is used to indicate a frequency domain resource in the BWP.

According to a fifth aspect, some embodiments of the present disclosure provide a terminal, including a memory, a processor, and a program stored in the memory and capable of running on the processor, where when the program is executed by the processor, the steps of the frequency domain resource allocation method on the terminal side according to some embodiments of the present disclosure are implemented.

According to a sixth aspect, some embodiments of the present disclosure provide a network device, including a memory, a processor, and a program stored in the memory and capable of running on the processor, where when the program is executed by the processor, the steps of the frequency domain resource allocation method on the network device side according to some embodiments of the present disclosure are implemented.

According to a seventh aspect, some embodiments of the present disclosure provide a computer-readable storage medium, where the computer-readable storage medium stores a computer program, and when the computer program is executed by a processor, the steps of the frequency domain resource allocation method on the terminal side according to some embodiments of the present disclosure are implemented, or when the computer program is executed by a processor, the steps of the frequency domain resource allocation method on the network device side according to some embodiments of the present disclosure are implemented.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments that a person of ordinary skill in the art obtains without creative efforts based on the embodiments of the present disclosure shall fall within the protection scope of the present disclosure.

In the specification and claims of this application, the term "include", and any other variant thereof mean to cover a non-exclusive inclusion. For example, a process, method, system, product, or device that includes a list of steps or units is not necessarily limited to those steps or units, but may include other steps or units not expressly listed or inherent to such a process, method, system, product, or device. In addition, the term "and/or" used in the specification and claims indicates at least one of connected objects. For example, "A and/or B" represents the following three cases: Only A exists, only B exists, and both A and B exist.

In some embodiments of the present disclosure, terms such as "an example" or "for example" are used to represent an example, an instance, or an illustration. Any embodiment or design scheme described as "an example" or "for example" in some embodiments of the present disclosure should not be construed as preferred or advantageous over other embodiments or design schemes. Specifically, the terms such as "an example" or "for example" are intended to present related concepts in a specific manner.

The following describes the embodiments of the present disclosure with reference to the accompanying drawings. A frequency domain resource allocation method, a terminal, and a network device provided in some embodiments of the present disclosure may be applied to a wireless communications system. The wireless communications system may be a new radio unlicensed (New Radio unlicensed, NRU) system, or an unlicensed band of another system, such as an unlicensed band of an evolved long term evolution (Evolved Long Term Evolution, eLTE) system, an unlicensed band of a long term evolution (Long Term Evolution, LTE) system, or an unlicensed band of a later evolved communications system.

Figure 1:
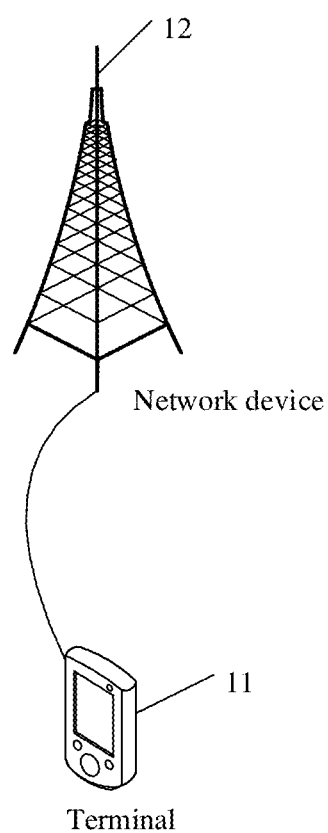
FIG. 1 is a structural diagram of a network system to which some embodiments of the present disclosure may be applied.

FIG. 1 is a structural diagram of a network system to which some embodiments of the present disclosure may be applied. As shown in FIG. 1, the network system includes a terminal 11 and a network device 12. The terminal 11 may be a user terminal (User Equipment, UE) or another terminal-side device, for example, a mobile phone, a tablet personal computer (Tablet Personal Computer), a laptop computer (Laptop Computer), a personal digital assistant (personal digital assistant, PDA), a mobile Internet device (MID), a wearable device (Wearable Device), or a robot. It should be noted that a specific type of the terminal 11 is not limited in some embodiments of the present disclosure. The network device 12 may be a 4G base station, a 5G base station, or a base station of a later version, or a base station in another communications system, or is referred to as a NodeB, or an evolved NodeB, or a transmission reception point (TRP), or an access point (AP), or other terms in the art. As long as a same technical effect is achieved, the network device is not limited to a specific technical term. In addition, the network device 12 may be a master node (Master Node, MN) or a secondary node (Secondary Node, SN). It should be noted that the 5G base station is used merely as an example in some embodiments of the present disclosure, rather than limiting a specific type of the network device.

Figure 2:
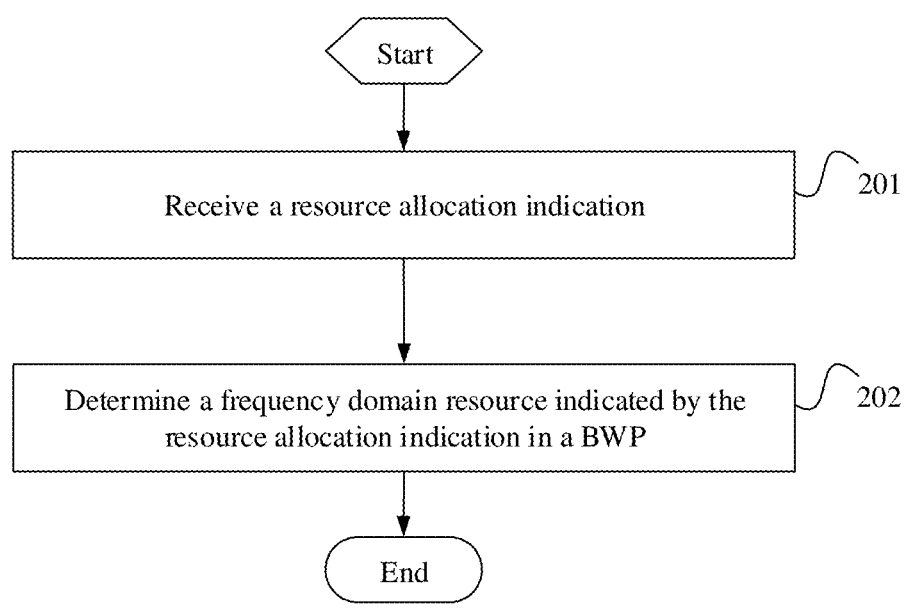
FIG. 2 is a flowchart of a frequency domain resource allocation method according to some embodiments of the present disclosure.

FIG. 2 is a flowchart of a frequency domain resource allocation method according to some embodiments of the present disclosure. The method is applied to a terminal. As shown in FIG. 2, the method includes the following steps.

Step 201: Receive a resource allocation indication, where the resource allocation indication corresponds to a parameter of a BWP configured for the terminal.

Step 201 may be receiving a resource allocation indication sent by a network device, where the resource allocation indication is used to allocate a frequency domain resource to the terminal. In addition, the resource allocation indication may be sent by using signaling such as downlink control information (DCI) or higher layer signaling.

The BWP configured for the terminal may be a BWP configured by the network device for the terminal. In addition, the BWP configured for the terminal may be a BWP activated by the terminal.

That the resource allocation indication corresponds to a parameter of a BWP configured for the terminal may be that an indication manner of the resource allocation indication corresponds to the parameter of the BWP, or may be that indication content of the resource allocation indication corresponds to the parameter of the BWP. In addition, that the resource allocation indication corresponds to a parameter of a BWP configured for the terminal may be understood as "the resource allocation indication is configured by the network device for the terminal based on the BWP configured for the terminal".

In some embodiments of the present disclosure, the parameter of the BWP may be subcarrier spacing, or may be a parameter such as bandwidth.

Step 202: Determine a frequency domain resource indicated by the resource allocation indication in the BWP.

The frequency domain resource may include an interlace, a resource block (RB), or a resource block group (RBG), so that the interlace, RB, or RBG is used as a granularity for resource allocation, to improve resource allocation accuracy.

It should be noted that, in some embodiments of the present disclosure, in some implementations or examples, the frequency domain resource is described as the interlace. For the RB and the RBG, refer to the corresponding description of the interlace to avoid repetition.

It should be noted that, in some embodiments of the present disclosure, one interlace may include a plurality of RBs that are spaced apart, such as a plurality of physical resource blocks (PRB). Optionally, one interlace may include a plurality of PRBs that are equally spaced apart. For example, in a case that the BWP is a 20 MHz bandwidth and a subcarrier spacing (SCS) is 15 kHz, a design of interlaces may be shown in FIG. 3, where each of interlaces 0, 1, 2, 3, 4, and 5 includes 11 PRBs, and each of interlaces 6, 7, 8, and 9 includes 10 PRBs. For example, interlace 0 includes PRBs 0, 10, 20, . . . , 90, and 100. The interlace 9 includes PRBs 9, 19, 29, . . . , 89, and 99.

The frequency domain resource indicated by the resource allocation indication in the BWP may be one or more frequency domain resources, and in a case of a plurality of frequency domain resources, the indicated frequency domain resources may be consecutive or inconsecutive frequency domain resources. For example, using an interlace as an example, the interlace indicated by the resource allocation indication may be one or more interlaces, and in a case of a plurality of interlaces, the indicated interlaces may be a plurality of consecutive interlaces or inconsecutive interlaces.

In addition, the frequency domain resource indicated above may be an uplink frequency domain resource or a downlink frequency domain resource.

In some embodiments of the present disclosure, the frequency domain resource in the BWP can be allocated to the terminal by performing the foregoing steps, to improve resource allocation accuracy. For example, resource allocation in an interlace structure can be implemented. In addition, because the resource allocation indication corresponding to the parameter of the BWP configured for the terminal is obtained, resource allocation is implemented flexibly, to improve flexibility of resource allocation.

In an optional implementation, in a case that the frequency domain resource includes an interlace, the parameter includes subcarrier spacing.

In this implementation, a correspondence between the resource allocation indication and the subcarrier spacing of the BWP configured for the terminal can be implemented to improve flexibility of resource allocation. For example, the indication manner of the resource allocation indication corresponds to the subcarrier spacing. Specifically, different manners may be used based on different subcarrier spacings to indicate the interlace allocated to the terminal.

Optionally, in a case that the subcarrier spacing is a first subcarrier spacing, the resource allocation indication indicates the resource by using a resource indication value (resource indication Value, RIV); or in a case that the subcarrier spacing is a second subcarrier spacing, the resource allocation indication indicates the resource in a form of a bitmap (bitmap), where the first subcarrier spacing is less than the second subcarrier spacing.

The first subcarrier spacing may be 15 kHz or another subcarrier spacing less than the second subcarrier spacing, and the second subcarrier spacing may be 30 kHz, 60 kHz, or the like.

The resource indication by using the RIV may be indicating, by using the RIV, a start interlace number and the number of consecutive interlaces allocated to the terminal.

The resource indication in the form of a bitmap may be that a length of the bitmap is equal to the number of interlaces, to indicate, by using the bitmap, the interlace allocated to the terminal.

In this implementation, in a case of a relatively small subcarrier spacing, the interlace configured for the terminal is indicated by using the RIV. This can provide flexibility of resource allocation and can reduce signaling overheads. For example, when the subcarrier spacing is 15 kHz, the network device indicates, in the form of a RIV, the start interlace number and the number of consecutive interlaces allocated to the terminal.

It should be noted that the form of a RIV herein indicates the allocated interlaces by indicating the number of consecutive interlaces allocated using a start interlace number for joint encoding, and may also be referred to as an interlace indicator value, that is, IIV, similar to a manner of indicating allocated RBGs by using the number of consecutive RBGs allocated using a start RBG number for joint encoding.

In addition, in the foregoing implementation, in a case of a relatively large subcarrier spacing, the bitmap is used to indicate the interlace allocated to the terminal. Therefore, allocation of consecutive or inconsecutive interlaces is implemented, and flexibility of resource allocation is further improved. For example, when the subcarrier spacing is 30 kHz or 60 kHz, the interlace allocated to the terminal is indicated in the form of a bitmap. A length of the bitmap is equal to the number of interlaces, meaning that, when the subcarrier spacing is 30 kHz, five interlaces are indicated by a 5-bit bitmap, or when the subcarrier spacing is 60 kHz, two or three interlaces are indicated by a 2-bit or 3-bit bitmap.

In the following description, it is assumed that the first subcarrier spacing is 15 kHz and that the second subcarrier spacing is 30 kHz.

The number of bits in a frequency domain resource allocation (FDRA) field in the DCI varies depending on the carrier spacing configured for the BWP. For example, five or six bits are used in the frequency domain resource allocation field to provide interlace resource allocation in an uplink slot (Frequency domain resource assignment—5 or 6 bits provide the interlace allocation in the UL slot), where when the SCS is 15 kHz, six bits are used, or when the SCS is 30 kHz, five bits are used.

For example, when the subcarrier spacing is 15 kHz, the network device indicates, in the form of a RIV, the start interlace number and the number of consecutive interlaces allocated to the terminal. Specifically, when the subcarrier spacing is 15 kHz, there are 10 interlaces in total. A RIV of $\lceil \log(10*11/2) \rceil = 6$ bits is required to indicate the interlace allocated to the terminal. The terminal may first determine the allocated interlace, that is, determine the start interlace number $\text{Interlace}_{start}$ and the number L of allocated consecutive interlaces, determine that the allocated interlace number is $\text{Interlace}_{start}+l$, where $l=0, 1, \ldots, L-1$, and then determine that the RB allocated to the terminal is:

$$\text{Interlace}_{start} + l + i \cdot N,$$

$$\text{where } N = \lfloor N_{RB}^{UL}/10 \rfloor, l = 0, 1, \cdots L - 1,$$

and for each l, $$i = 0, 1, \ldots, N_{RB}^{interlace_{Interlace_{start}+l}} - 1, \text{ where } N_{RB}^{interlace_{Interlace_{start}+l}}$$

indicates the number of RBs included in the allocated interlace numbered $\text{Interlace}_{start}+l$. $0 \leq RIV < N(N+1)/2$, and a RIV value corresponds to the start interlace number $\text{Interlace}_{start}$ and the number L of interlaces ($L \geq 1$). The RIV value is defined as:

```
if (L−1) ≤ ⌊N / 2⌋ then
    RIV = N(L − 1) + Interlace_start
else
    RIV = N(N − L + 1) + (N − 1 − Interlace_start).
```

In the foregoing manner, the interlace indicated by the RIV can be accurately determined, and signaling overheads can be reduced.

For another example, when the bandwidth is 20 MHz, and the subcarrier spacing is 15 kHz, $N_{RB}^{UL}=106$ and $N=\lfloor N_{RB}^{UL}/10 \rfloor$. When the RIV value is 10, $\text{Interlace}_{start}=0$ may be determined, and L=1, that is, the network device allocates interlace 0 to the terminal, and a corresponding RB index is $\text{Interlace}_{start}+l+i \cdot N$, where $l=0$, $i=0, 1, \ldots, N_{RB}^{Interlace_0}-1$, and $N_{RB}^{Interlace_0}=11$ (for example, interlace 0 shown in FIG. 3 includes 11 PRBs), that is, $i=0, 1, \ldots, 10$, and allocated RB indexes may be obtained which are 0, 10, 20, . . . , 100.

Figure 3:
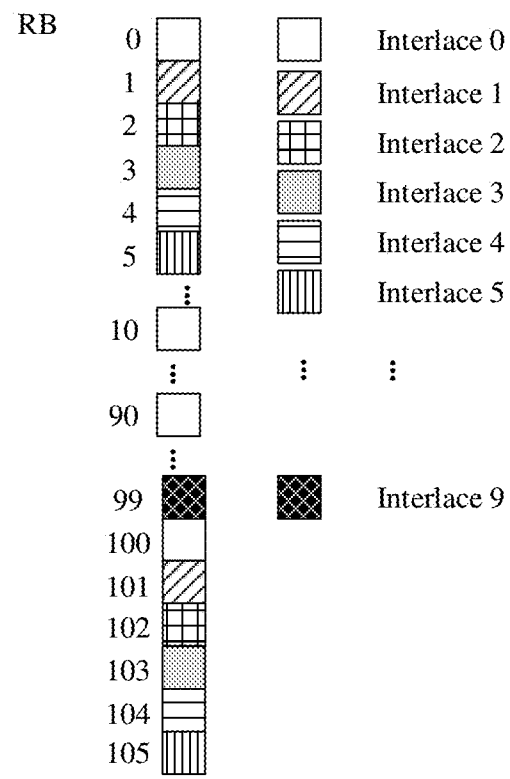
FIG. 3 is a schematic diagram of an interlace according to some embodiments of the present disclosure.

When the RIV value is 15, $\text{Interlace}_{start}=5$ may be determined, and L=2, that is, the network device allocates interlace 5 and the interlace 6 to the terminal. As shown in FIG. 3, interlace 5 includes 11 RBs, that is, $N_{RB}^{Interlace_5}=11$, and the interlace 6 includes 10 RBs, that is, $N_{RB}^{Interlace_6}=10$. A corresponding RB index is $\text{Interlace}_{start}+l+i \cdot N$, where $l=0$ or 1. When $l=0$, $i=0, 1, \ldots, N_{RB}^{Interlace_5}-1$, where $N_{RB}^{Interlace_5}=11$. When $l=1$, $i=0, 1, \ldots, N_{RB}^{Interlace_6}-1$, where $N_{RB}^{Interlace_6}=10$. Allocated RB indexes may be obtained which are 5, 6, 15, 16, 25, . . . , 95, 96, and 105.

It should be noted that some embodiments of the present disclosure do not limit determining of the indicated interlace by using the RIV. For example, the interlace indicated by the RIV may be determined by referring to the manner of indicating the RB by the RIV; or for another example, a mapping relationship between the RIV value, and the start interlace and the number of interlaces may be preset, and the interlace indicated by the RIV is determined based on the mapping relationship.

When the subcarrier spacing is 30 kHz or 60 kHz, the interlace allocated to the terminal is indicated in the form of a bitmap. A length of the bitmap is equal to the number of interlaces, meaning that when the subcarrier spacing is 30 kHz, five interlaces are indicated by a 5-bit bitmap; or when the subcarrier spacing is 60 kHz, two or three interlaces are indicated by a 2-bit or 3-bit bitmap.

When the subcarrier spacing is 30 kHz, there are five interlaces in total. A 5-bit bitmap is required to indicate the interlace allocated to the terminal. A bitmap in the resource allocation field indicates a bitmap for allocating the interlace number l, where the interlace number l=0, 1, 2, 3, or 4. A sequence of mapping an interlace set to bits in the bitmap is that l=0 to l=4 respectively correspond to a most significant bit (Most Significant Bit, MSB) to a least significant bit (Least Significant Bit, LSB) in the bitmap. If a corresponding bit in the bitmap is 1, it indicates that a corresponding interlace is allocated to the terminal; otherwise, it indicates that the corresponding interlace is not allocated to the terminal. For example, 10100 indicates that the interlaces 0 and 2 are allocated to the terminal, and that the rest are not allocated to the terminal.

In an optional implementation, the foregoing parameter includes bandwidth.

It should be noted that, in this implementation, the foregoing frequency domain resource may be an interlace, an RB, or an RBG. In other words, in this implementation, the interlace, the RB, or the RBG in the BWP is allocated to the terminal based on the resource allocation indication corresponding to the bandwidth of the BWP configured for the terminal.

In this implementation, a correspondence between the resource allocation indication and the bandwidth of the BWP configured for the terminal can be implemented to improve flexibility of resource allocation. For example, the indication manner of the resource allocation indication corresponds to the bandwidth. Specifically, different manners may be used based on different bandwidths to indicate the interlace, the RB, or the RBG allocated to the terminal.

Optionally, in a case that the bandwidth is greater than a first bandwidth value, the resource allocation indication is used to indicate the following content:

a listening subband allocated to the terminal; and a frequency domain resource allocated to the terminal in the listening subband.

In addition, the first bandwidth value may be configured by the network device, or defined in a protocol, or preset by the terminal and the network device. For example, the first bandwidth value may be 20 MHz. In this way, when the BWP bandwidth configured for the terminal is greater than 20 MHz, the frequency domain resource allocated to the terminal is indicated in the foregoing manner. Further, the first bandwidth value may be greater than a bandwidth value of the listening subband.

The listening subband allocated to the terminal may be one or more listening subbands included in the BWP configured for the terminal, and the frequency domain resources allocated to the terminal in the listening subband may be same or different interlaces, RBs, or RBGs allocated in the one or more listening subbands.

In some embodiments of the present disclosure, the listening subband may be a listen before talk subband (LBT subband).

In this implementation, in a case that the bandwidth is greater than the first bandwidth value, the resource allocation indication is used to indicate the listening subband and the frequency domain resource allocated to the terminal in the listening subband, such as the interlace, the RB, or the RBG to implement flexible resource allocation, and the network side can indicate a listening subband with a good channel condition based on the channel condition of the listening subband. Therefore, complexity of listening by the terminal can be reduced, and power consumption of the terminal is reduced.

Certainly, in some embodiments of the present disclosure, in a case that the bandwidth is less than or equal to the first bandwidth value, the resource allocation indication may indicate the frequency domain resources allocated to the terminal, such as the interlace, the RB, or the RBG, without indicating the listening subband, to implement flexible resource allocation and reduce signaling overheads.

It should be noted that the indication of the frequency domain resource in the foregoing implementation may indicate the frequency domain resource by using the RIV or the bitmap. Further, in a case that the frequency domain resource is the interlace, the indication can be implemented with reference to the subcarrier spacing provided above. For example, in the case that the subcarrier spacing is the first subcarrier spacing, the interlace is indicated by using the RIV; or in the case that the subcarrier spacing is the second subcarrier spacing, the interlace is indicated in the form of a bitmap. In addition, the indicated listening subband and interlace may be indicated by using a same information field of signaling and may be jointly encoded, or may be indicated by using two different information fields of signaling.

It should be noted that the indication of the frequency domain resource in the foregoing implementation may indicate the frequency domain resource by using the RIV or the bitmap. Further, in a case that the frequency domain resource is the RB or the RBG, the number of the RB or RBG may be the same number in the entire BWP or an offset value relative to a start RB or RBG of the LBT subband. When the RB or RBG indicated by using the RIV or bitmap is the offset value relative to the start RB or RBG of the LBT subband, overheads of the RIV or bitmap can be reduced.

It should be noted that, in the foregoing implementation, in the case that the bandwidth is greater than the first bandwidth value, the resource allocation indication may flexibly indicate, in a plurality of indication manners, the listening subband and the frequency domain resource allocated to the terminal in the listening subband.

For example, in a manner 1, the resource allocation indication is used to indicate M listening subbands allocated to the terminal, and one piece of indication content is used to indicate frequency domain resources allocated to the terminal in the M listening subbands; or in a manner 2, the resource allocation indication is used to indicate M listening subbands allocated to the terminal, and M pieces of indication content are each used to indicate a frequency domain resource allocated to the terminal in one listening subband; or in a manner 3, the resource allocation indication is used to indicate N listening subband groups allocated to the terminal, N pieces of indication content are each used to indicate a frequency domain resource allocated to the terminal in one listening subband group, and each listening subband group includes at least one listening subband, where M is an integer greater than or equal to 1, and N is an integer less than or equal to M.

The indication content may be in the form of a RIV or a bitmap.

In the manner 1, a same frequency domain resource can be allocated to M listening subbands, and signaling overheads can be reduced. For example, assuming that the frequency domain resource is the interlace, the network device indicates an LBT subband allocated to the terminal and a RIV or a bitmap. To be specific, when a plurality of LBT subbands are allocated to the terminal, interlaces allocated in the LBT subbands are the same.

In the manner 2, the corresponding frequency domain resource can be indicated for each indicated listening subband, to improve flexibility of resource allocation. For example, assuming that the frequency domain resource is the interlace, the network device indicates an LBT subband allocated to the terminal and a RIV or a bitmap of each LBT subband. To be specific, when a plurality of LBT subbands are allocated to the terminal, interlaces allocated in the LBT subbands may be different or the same.

In the manner 3, N listening subband groups can be indicated, and the frequency domain resource in each listening subband group can be indicated separately. Due to division of different listening subband groups, not only flexibility of resource allocation is considered, but also the number of bits is reduced. For example, assuming that the frequency domain resource is the interlace, when the BWP configured for the terminal is greater than or equal to a bandwidth value (which can be represented by X), LBT subbands included in the BWP are divided into N LBT subband groups, and for the LBT subband groups, different RIVs or bitmaps are used to indicate interlaces.

In the foregoing three manners, different listening subbands can be allocated to the terminal and the corresponding frequency domain resource can be indicated for each listening subband. For example, different listening subbands are allocated to the terminal and the corresponding interlace, RB, or RBG is indicated for each listening subband. To be specific, when broadband transmission is configured for the terminal, the network device can indicate consecutively or inconsecutively allocated interlaces, RBs, or RBGs for each listening subband in the manner 1, the manner 2, or the manner 3.

It should be noted that a specific manner to be used can be determined from the foregoing three manners based on the bandwidth of the BWP configured for the terminal. For example, in a specific implementation:

in a case that the bandwidth is greater than the first bandwidth value and less than a second bandwidth value, the resource allocation indication is used to indicate M listening subbands allocated to the terminal, and one piece of indication content is used to indicate frequency domain resources allocated to the terminal in the M listening subbands;

or in a case that the bandwidth is greater than or equal to the second bandwidth value, the resource allocation indication is used to indicate M listening subbands allocated to the terminal, and M pieces of indication content are each used to indicate a frequency domain resource allocated to the terminal in one listening subband; or the resource allocation indication is used to indicate N listening subband groups allocated to the terminal, N pieces of indication content are each used to indicate a frequency domain resource allocated to the terminal in one listening subband group, and each listening subband group includes at least one listening subband, where the second bandwidth value is greater than the first bandwidth value.

The second bandwidth value may be configured by the network device, or defined in a protocol, or preset by the terminal and the network device. For example, the second bandwidth value may be 40 MHz, 60 MHz, or 80 MHz.

In this implementation, when the bandwidth is narrow, a same frequency domain resource indication can be used for each listening subband, to reduce the number of bits and reduce the signaling overheads. When the bandwidth is large, usage of frequency domain resources in different subbands may be different, and the frequency domain resources in different subbands are respectively indicated to improve scheduling flexibility.

For example, in another specific implementation:

in a case that the bandwidth is greater than the first bandwidth value and less than a third bandwidth value, the resource allocation indication is used to indicate M listening subbands allocated to the terminal, and M pieces of indication content are each used to indicate a frequency domain resource allocated to the terminal in one listening subband;

or in a case that the bandwidth is greater than or equal to the third bandwidth value, the resource allocation indication is used to indicate M listening subbands allocated to the terminal, and one piece of indication content is used to indicate frequency domain resources allocated to the terminal in the M listening subbands; or the resource allocation indication is used to indicate N listening subband groups allocated to the terminal, N pieces of indication content are each used to indicate a frequency domain resource allocated to the terminal in one listening subband group, and each listening subband group includes at least one listening subband; where the third bandwidth value is greater than the first bandwidth value.

The third bandwidth value may be configured by the network device, or defined in a protocol, or preset by the terminal and the network device. For example, the third bandwidth value may be 40 MHz, 60 MHz, or 80 MHz. Further, the third bandwidth value and the second bandwidth value may be a same bandwidth value or different bandwidth values.

In this implementation, when the bandwidth is narrow, different frequency domain resource indications can be used for each listening subband. Because the number of listening subbands is small and the number of required bits is within an acceptable range, flexible scheduling can be implemented. When the bandwidth is large, a same frequency domain resource indication is used for each listening subband or each listening subband group, to reduce the number of bits and reduce the signaling overheads.

In the following description, it is assumed that the first bandwidth value is 20 MHz and that the frequency domain resource is the interlace.

When the BWP bandwidth configured for the terminal is greater than 20 MHz, the frequency domain resource allocated to the terminal is indicated in the following manners:

Manner 1: The network device indicates listening subbands allocated to the terminal and one RIV or bitmap. To be specific, when a plurality of listening subbands are allocated to the terminal, interlaces allocated in the listening subbands are the same.

Manner 2: The network device indicates listening subbands allocated to the terminal and a RIV or a bitmap of each listening subband. To be specific, when a plurality of listening subbands are allocated to the terminal, interlaces allocated in each listening subband may be different.

Further, use of the manner 1, the manner 2, or a manner 3 can be determined based on the bandwidth configured for the terminal. For example, when the BWP configured for the terminal is less than or equal to X (for example, the second bandwidth value or the third bandwidth value), the manner 1 is used; otherwise, the manner 2 or manner 3 is used.

Further, the network device configures use of the manner 1, the manner 2, or the manner 3 by using higher layer signaling.

For example, the BWP configured for the terminal is 40 MHz, and the network device may indicate, in the form of a bitmap, the LBT subband allocated to the terminal.

In this way, in the manner 1, when scheduling the terminal, the network device indicates allocation of 11, which means that two LBT subbands in the 40 MHz BWP are both allocated to the terminal, and one RIV or bitmap indicates allocated interlaces, such as the interlaces 0 and 1, which means that the terminal uses the same interlaces in both the two LBT subbands.

In this way, in the manner 2, when scheduling the terminal, the network device indicates allocation of 11, which means that two LBT subbands in the 40 MHz BWP are both allocated to the terminal, and a corresponding RIV or bitmap of each LBT subband indicates allocated interlaces, such as interlace 0 allocated in LBT subband 0, and interlace 0 and interlace 1 allocated in LBT subband 1.

Manner 3: When the BWP configured for the terminal is greater than or equal to X (for example, the second bandwidth value or the third bandwidth value), LBT subbands included in the BWP are divided into N LBT subband groups, and different RVIs or bitmaps are used for the LBT subband groups.

Figure 4:
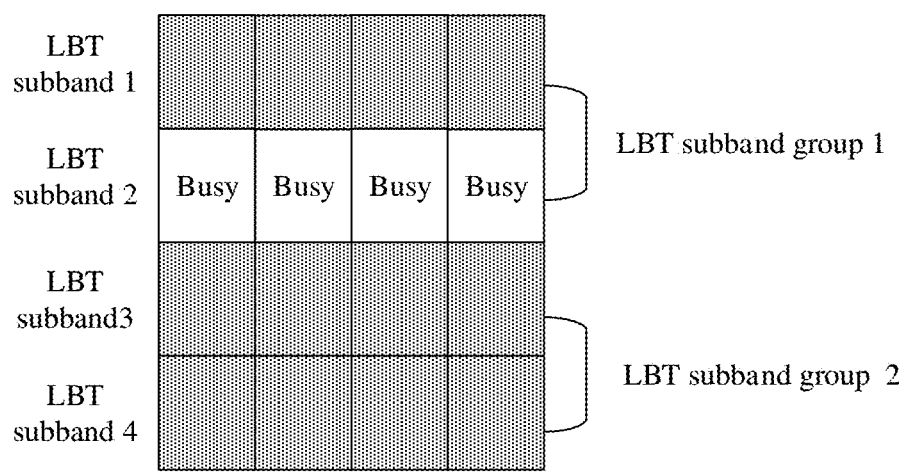
FIG. 4 is a schematic diagram of division of listening subband groups according to some embodiments of the present disclosure.

When the BWP configured for the terminal includes a large number of LBT subbands, such as 80 MHz and 120 MHz, if the RIV or bitmap of each LBT subband is given in the manner 2, more bits are required, which increases a size of the DCI. In this case, a plurality of LBT subbands may be divided into different groups, that is, LBT subband groups, and each group uses one RIV or bitmap to indicate the allocated interlace. For example, 80 MHz and 120 MHz respectively include four and six LBT subbands. As shown in FIG. 4, a plurality of LBT subbands are divided into two groups, and the two groups include two and three LBT subbands respectively.

In an optional implementation, the indication manner of the resource allocation indication is configured by using signaling. In this way, the terminal can accurately parse the indicated frequency domain resource and the listening subband. For example, the network device configures the indication manner of the resource allocation indication by using higher layer signaling or physical layer signaling, for example: indicating the manner 1, the manner 2, or the manner 3, or indicating the form of the foregoing RIV or bitmap.

Certainly, in some embodiments of the present disclosure, configuring the indication manner by using signaling is not limited. For example, it is prescribed or specified by a protocol that the corresponding indication manner is determined based on the bandwidth or the subcarrier spacing.

In the frequency domain resource allocation method provided in some embodiments of the present disclosure, the resource allocation indication corresponding to the parameter of the BWP configured for the terminal can be obtained to indicate the frequency domain resource in the BWP, thereby improving resource allocation accuracy. In addition, resource allocation can be performed flexibly. For example, in some cases, consecutive or inconsecutive interlaces are configured, or corresponding interlaces are configured for different listening subbands. Further, signaling overheads can be reduced. For example, a plurality of interlaces are indicated by using the RIV, or listening subbands are divided into listening subband groups, or interlaces in a plurality of listening subbands are indicated by using one piece of indication content. Specifically, assuming that the frequency domain resource is the interlace, the foregoing frequency domain resource allocation method provided in some embodiments of the present disclosure in an NRU system can be implemented as follows:

1. Based on different subcarrier spacings, different manners are used to indicate the interlace allocated to the terminal.

For example, when the subcarrier spacing is 15 kHz, the network device indicates, in the form of a RIV, the start interlace number and the number of consecutive interlaces allocated to the terminal.

For example, when the subcarrier spacing is 30 kHz or 60 kHz, the interlace allocated to the terminal is indicated in the form of a bitmap. A length of the bitmap is equal to the number of interlaces, meaning that when the subcarrier spacing is 30 kHz, five interlaces are indicated by a 5-bit bitmap; or when the subcarrier spacing is 60 kHz, two or three interlaces are indicated by a 2-bit or 3-bit bitmap.

2. When the BWP bandwidth configured for the terminal is greater than 20 MHz, the frequency domain resource allocated to the terminal is indicated in the following manner:

Solution 1: The network device indicates an LBT subband allocated to the terminal and one RIV or bitmap. To be specific, when a plurality of LBT subbands are allocated to the terminal, interlaces allocated in the LBT subbands are the same.

Solution 2: The network device indicates an LBT subband allocated to the terminal and a RIV or a bitmap of each LBT subband. To be specific, when a plurality of LBT subbands are allocated to the terminal, interlaces allocated in the LBT subbands may be different.

Solution 3: Use of the solution 1 or solution 2 is determined based on the bandwidth configured for the terminal. For example, when the BWP configured for the terminal is greater than or equal to X, the solution 1 is used; otherwise, the solution 2 is used.

Solution 4: The network device configures use of the solution 1 or solution 2 by using higher layer signaling.

Solution 5: When the BWP configured for the terminal is greater than or equal to X, the LBT subbands included in the BWP are divided into N LBT subband groups, and different RVIs or bitmaps are used for the LBT subband groups.

Figure 5:
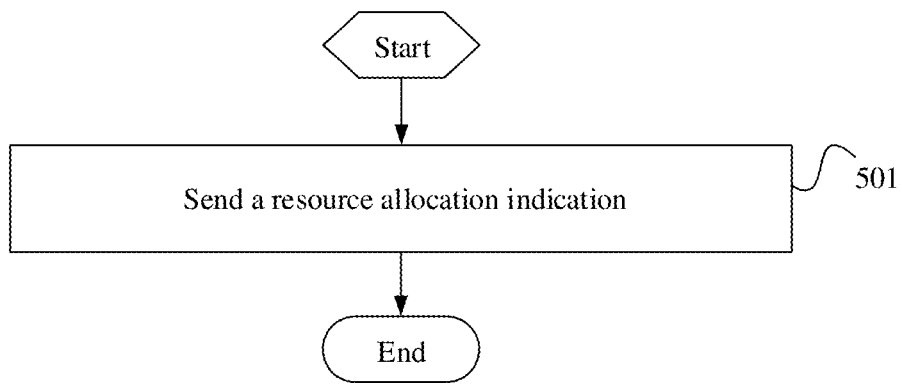
FIG. 5 is another flowchart of a frequency domain resource allocation method according to some embodiments of the present disclosure.

Some embodiments of the present disclosure can provide an uplink resource allocation method in an interlace channel structure in the NRU system, to use different indication manners in different subcarrier spacings and frequency domain resource indication manners in wideband condi- FIG. 5 is a flowchart of another frequency domain resource allocation method according to some embodiments of the present disclosure. The method is applied to a network device. As shown in FIG. 5, the method includes the following step.

Step 501: Send a resource allocation indication, where the resource allocation indication corresponds to a parameter of a BWP configured for a terminal, and the resource allocation indication is used to indicate a frequency domain resource in the BWP.

Optionally, the frequency domain resource includes an interlace, an RB, or an RBG.

Optionally, in a case that the frequency domain resource includes an interlace, the parameter includes subcarrier spacing.

Optionally, in a case that the subcarrier spacing is a first subcarrier spacing, the resource allocation indication indicates the resource by using a RIV; or
in a case that the subcarrier spacing is a second subcarrier spacing, the resource allocation indication indicates the resource in a form of a bitmap, where
the first subcarrier spacing is less than the second subcarrier spacing.

Optionally, the parameter includes bandwidth.

Optionally, in a case that the bandwidth is greater than a first bandwidth value, the resource allocation indication is used to indicate the following content:
a listening subband allocated to the terminal; and
a frequency domain resource allocated to the terminal in the listening subband.

Optionally, the resource allocation indication is used to indicate M listening subbands allocated to the terminal, and one piece of indication content is used to indicate frequency domain resources allocated to the terminal in the M listening subbands; or
the resource allocation indication is used to indicate M listening subbands allocated to the terminal, and M pieces of indication content are each used to indicate a frequency domain resource allocated to the terminal in one listening subband; or
the resource allocation indication is used to indicate N listening subband groups allocated to the terminal, N pieces of indication content are each used to indicate a frequency domain resource allocated to the terminal in one listening subband group, and each listening subband group includes at least one listening subband, where
M is an integer greater than or equal to 1, and N is an integer less than or equal to M.

Optionally, in a case that the bandwidth is greater than the first bandwidth value and less than a second bandwidth value,
the resource allocation indication is used to indicate M listening subbands allocated to the terminal, and one piece of indication content is used to indicate frequency domain resources allocated to the terminal in the M listening subbands;
or
in a case that the bandwidth is greater than or equal to the second bandwidth value,
the resource allocation indication is used to indicate M listening subbands allocated to the terminal, and M pieces of indication content are each used to indicate a frequency domain resource allocated to the terminal in one listening subband; or the resource allocation indication is used to indicate N listening subband groups allocated to the terminal, N pieces of indication content are each used to indicate a frequency domain resource allocated to the terminal in one listening subband group, and each listening subband group includes at least one listening subband, where
the second bandwidth value is greater than the first bandwidth value.

Optionally, in a case that the bandwidth is greater than the first bandwidth value and less than a third bandwidth value,
the resource allocation indication is used to indicate M listening subbands allocated to the terminal, and M pieces of indication content are each used to indicate a frequency domain resource allocated to the terminal in one listening subband;
or
in a case that the bandwidth is greater than or equal to the third bandwidth value,
the resource allocation indication is used to indicate M listening subbands allocated to the terminal, and one piece of indication content is used to indicate frequency domain resources allocated to the terminal in the M listening subbands; or the resource allocation indication is used to indicate N listening subband groups allocated to the terminal, N pieces of indication content are each used to indicate a frequency domain resource allocated to the terminal in one listening subband group, and each listening subband group includes at least one listening subband; where
the third bandwidth value is greater than the first bandwidth value.

Optionally, an indication manner of the resource allocation indication is configured by using signaling.

It should be noted that this embodiment is used as an implementation of the network device side corresponding to the embodiment shown in FIG. 2. For a specific implementation of this embodiment, reference may be made to the related descriptions of the embodiment shown in FIG. 2. To avoid repetition, details are not described herein again. In this embodiment, resource allocation accuracy can also be improved.

Figure 6:
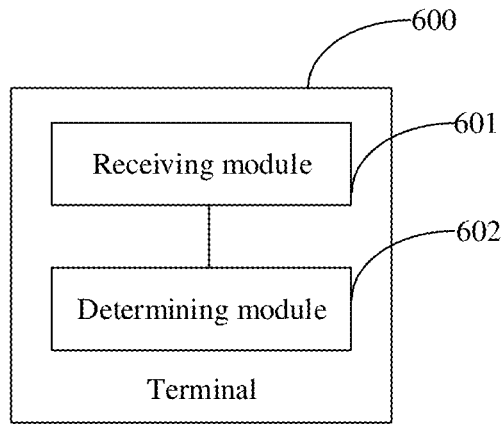
FIG. 6 is a structural diagram of a terminal according to some embodiments of the present disclosure.

FIG. 6 is a structural diagram of a terminal according to some embodiments of the present disclosure. As shown in FIG. 6, the terminal 600 includes:
a receiving module 601, configured to receive a resource allocation indication, where the resource allocation indication corresponds to a parameter of a BWP configured for the terminal; and
a determining module 602, configured to determine a frequency domain resource indicated by the resource allocation indication in the BWP.

Optionally, the frequency domain resource includes an interlace, an RB, or an RBG.

Optionally, in a case that the frequency domain resource includes an interlace, the parameter includes subcarrier spacing.

Optionally, in a case that the subcarrier spacing is a first subcarrier spacing, the resource allocation indication indicates the resource by using a RIV; or
in a case that the subcarrier spacing is a second subcarrier spacing, the resource allocation indication indicates the resource in a form of a bitmap, where
the first subcarrier spacing is less than the second subcarrier spacing.

Optionally, the parameter includes bandwidth.

Optionally, in a case that the bandwidth is greater than a first bandwidth value, the resource allocation indication is used to indicate the following content:
a listening subband allocated to the terminal; and
a frequency domain resource allocated to the terminal in the listening subband.

Optionally, the resource allocation indication is used to indicate M listening subbands allocated to the terminal, and one piece of indication content is used to indicate frequency domain resources allocated to the terminal in the M listening subbands; or
the resource allocation indication is used to indicate M listening subbands allocated to the terminal, and M pieces of indication content are each used to indicate a frequency domain resource allocated to the terminal in one listening subband; or
the resource allocation indication is used to indicate N listening subband groups allocated to the terminal, N pieces of indication content are each used to indicate a frequency domain resource allocated to the terminal in one listening subband group, and each listening subband group includes at least one listening subband, where
M is an integer greater than or equal to 1, and N is an integer less than or equal to M.

Optionally, in a case that the bandwidth is greater than the first bandwidth value and less than a second bandwidth value,
the resource allocation indication is used to indicate M listening subbands allocated to the terminal, and one piece of indication content is used to indicate frequency domain resources allocated to the terminal in the M listening subbands;
or
in a case that the bandwidth is greater than or equal to the second bandwidth value,
the resource allocation indication is used to indicate M listening subbands allocated to the terminal, and M pieces of indication content are each used to indicate a frequency domain resource allocated to the terminal in one listening subband; or the resource allocation indication is used to indicate N listening subband groups allocated to the terminal, N pieces of indication content are each used to indicate a frequency domain resource allocated to the terminal in one listening subband group, and each listening subband group includes at least one listening subband, where
the second bandwidth value is greater than the first bandwidth value.

Optionally, in a case that the bandwidth is greater than the first bandwidth value and less than a third bandwidth value,
the resource allocation indication is used to indicate M listening subbands allocated to the terminal, and M pieces of indication content are each used to indicate a frequency domain resource allocated to the terminal in one listening subband;
or
in a case that the bandwidth is greater than or equal to the third bandwidth value,
the resource allocation indication is used to indicate M listening subbands allocated to the terminal, and one piece of indication content is used to indicate frequency domain resources allocated to the terminal in the M listening subbands; or the resource allocation indication is used to indicate N listening subband groups allocated to the terminal, N pieces of indication content are each used to indicate a frequency domain resource allocated to the terminal in one listening subband group, and each listening subband group includes at least one listening subband; where
the third bandwidth value is greater than the first bandwidth value.

Optionally, an indication manner of the resource allocation indication is configured by using signaling.

The terminal provided in some embodiments of the present disclosure can implement each process implemented by the terminal in the method embodiment in FIG. 2. To avoid repetition, details are not described herein again. In addition, resource allocation accuracy can be improved.

Figure 7:
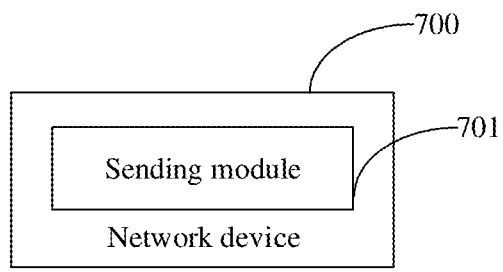
FIG. 7 is a structural diagram of a network device according to some embodiments of the present disclosure.

FIG. 7 is a structural diagram of a network device according to some embodiments of the present disclosure. As shown in FIG. 7, the network device 700 includes:
a sending module 701, configured to send a resource allocation indication, where the resource allocation indication corresponds to a parameter of a BWP configured for a terminal, and the resource allocation indication is used to indicate a frequency domain resource in the BWP.

Optionally, the frequency domain resource includes an interlace, an RB, or an RBG.

Optionally, in a case that the frequency domain resource includes an interlace, the parameter includes subcarrier spacing.

Optionally, in a case that the subcarrier spacing is a first subcarrier spacing, the resource allocation indication indicates the resource by using a RIV; or
in a case that the subcarrier spacing is a second subcarrier spacing, the resource allocation indication indicates the resource in a form of a bitmap, where
the first subcarrier spacing is less than the second subcarrier spacing.

Optionally, the parameter includes bandwidth.

Optionally, in a case that the bandwidth is greater than a first bandwidth value, the resource allocation indication is used to indicate the following content:
a listening subband allocated to the terminal; and
a frequency domain resource allocated to the terminal in the listening subband.

Optionally, the resource allocation indication is used to indicate M listening subbands allocated to the terminal, and one piece of indication content is used to indicate frequency domain resources allocated to the terminal in the M listening subbands; or
the resource allocation indication is used to indicate M listening subbands allocated to the terminal, and M pieces of indication content are each used to indicate a frequency domain resource allocated to the terminal in one listening subband; or
the resource allocation indication is used to indicate N listening subband groups allocated to the terminal, N pieces of indication content are each used to indicate a frequency domain resource allocated to the terminal in one listening subband group, and each listening subband group includes at least one listening subband, where
M is an integer greater than or equal to 1, and N is an integer less than or equal to M.

Optionally, in a case that the bandwidth is greater than the first bandwidth value and less than a second bandwidth value,
the resource allocation indication is used to indicate M listening subbands allocated to the terminal, and one piece of indication content is used to indicate frequency domain resources allocated to the terminal in the M listening subbands;

or in a case that the bandwidth is greater than or equal to the second bandwidth value, the resource allocation indication is used to indicate M listening subbands allocated to the terminal, and M pieces of indication content are each used to indicate a frequency domain resource allocated to the terminal in one listening subband; or the resource allocation indication is used to indicate N listening subband groups allocated to the terminal, N pieces of indication content are each used to indicate a frequency domain resource allocated to the terminal in one listening subband group, and each listening subband group includes at least one listening subband, where the second bandwidth value is greater than the first bandwidth value.

Optionally, in a case that the bandwidth is greater than the first bandwidth value and less than a third bandwidth value, the resource allocation indication is used to indicate M listening subbands allocated to the terminal, and M pieces of indication content are each used to indicate a frequency domain resource allocated to the terminal in one listening subband;

or in a case that the bandwidth is greater than or equal to the third bandwidth value, the resource allocation indication is used to indicate M listening subbands allocated to the terminal, and one piece of indication content is used to indicate frequency domain resources allocated to the terminal in the M listening subbands; or the resource allocation indication is used to indicate N listening subband groups allocated to the terminal, N pieces of indication content are each used to indicate a frequency domain resource allocated to the terminal in one listening subband group, and each listening subband group includes at least one listening subband; where the third bandwidth value is greater than the first bandwidth value.

Optionally, an indication manner of the resource allocation indication is configured by using signaling.

The network device provided in some embodiments of the present disclosure can implement each process implemented by the terminal in the method embodiment in FIG. 5. To avoid repetition, details are not described herein again. In addition, resource allocation accuracy can be improved.

Figure 8:
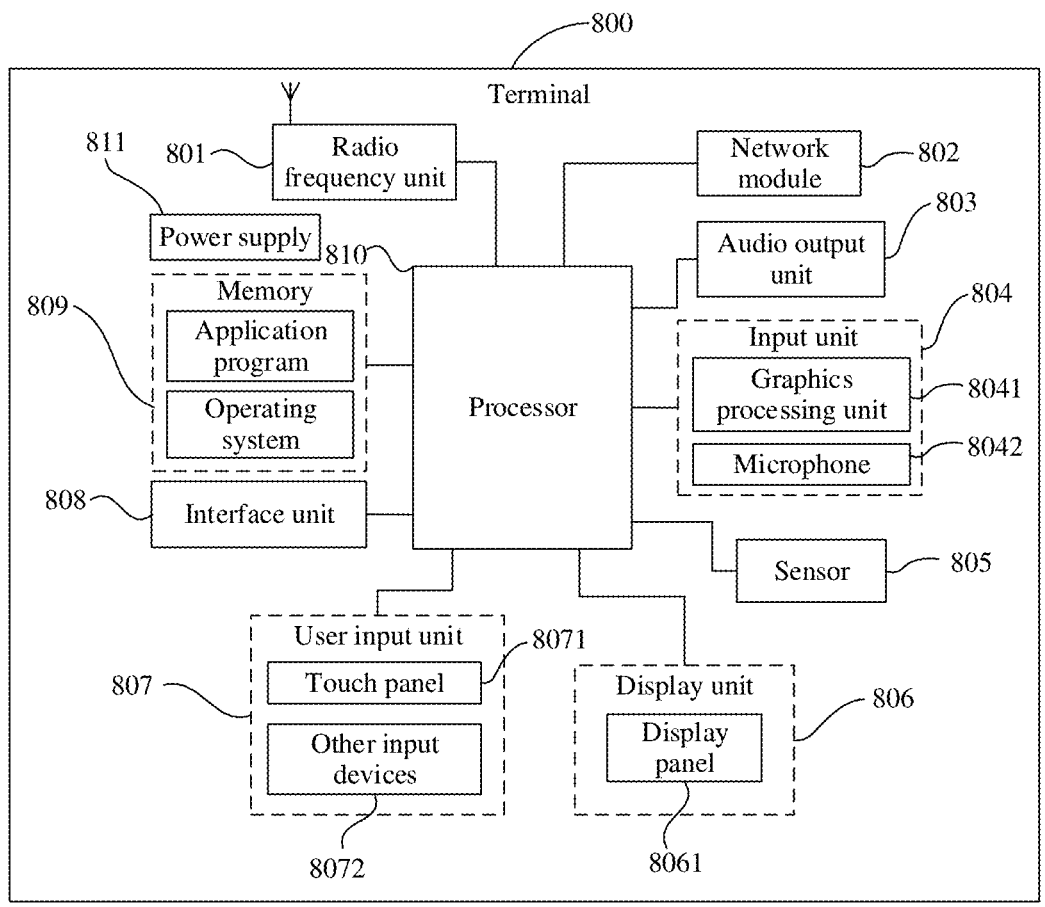
FIG. 8 is another structural diagram of a terminal according to some embodiments of the present disclosure.

FIG. 8 is a schematic diagram of a hardware structure of a terminal for implementing the embodiments of the present disclosure.

The terminal 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that the structure of the terminal shown in FIG. 8 does not constitute a limitation on the terminal. A quantity of components included in the terminal may be greater or less than that shown in the figure, or some components are combined, or component arrangements are different. In some embodiments of the present disclosure, the terminal includes but is not limited to a mobile phone, a tablet computer, a laptop computer, a palmtop computer, an in-vehicle terminal, a robot, a wearable device, a pedometer, and the like.

The radio frequency unit 801 is configured to receive a resource allocation indication, where the resource allocation indication corresponds to a parameter of a BWP configured for the terminal.

The processor 810 is configured to determine a frequency domain resource indicated by the resource allocation indication in the BWP.

Optionally, the frequency domain resource includes an interlace, an RB, or an RBG.

Optionally, in a case that the frequency domain resource includes an interlace, the parameter includes subcarrier spacing.

Optionally, in a case that the subcarrier spacing is a first subcarrier spacing, the resource allocation indication indicates the resource by using a RIV; or in a case that the subcarrier spacing is a second subcarrier spacing, the resource allocation indication indicates the resource in a form of a bitmap, where the first subcarrier spacing is less than the second subcarrier spacing.

Optionally, the parameter includes bandwidth.

Optionally, in a case that the bandwidth is greater than a first bandwidth value, the resource allocation indication is used to indicate the following content:

a listening subband allocated to the terminal; and a frequency domain resource allocated to the terminal in the listening subband.

Optionally, the resource allocation indication is used to indicate M listening subbands allocated to the terminal, and one piece of indication content is used to indicate frequency domain resources allocated to the terminal in the M listening subbands; or the resource allocation indication is used to indicate M listening subbands allocated to the terminal, and M pieces of indication content are each used to indicate a frequency domain resource allocated to the terminal in one listening subband; or the resource allocation indication is used to indicate N listening subband groups allocated to the terminal, N pieces of indication content are each used to indicate a frequency domain resource allocated to the terminal in one listening subband group, and each listening subband group includes at least one listening subband, where M is an integer greater than or equal to 1, and N is an integer less than or equal to M.

Optionally, in a case that the bandwidth is greater than the first bandwidth value and less than a second bandwidth value, the resource allocation indication is used to indicate M listening subbands allocated to the terminal, and one piece of indication content is used to indicate frequency domain resources allocated to the terminal in the M listening subbands;

or in a case that the bandwidth is greater than or equal to the second bandwidth value, the resource allocation indication is used to indicate M listening subbands allocated to the terminal, and M pieces of indication content are each used to indicate a frequency domain resource allocated to the terminal in one listening subband; or the resource allocation indication is used to indicate N listening subband groups allocated to the terminal, N pieces of indication content are each used to indicate a frequency domain resource allocated to the terminal in one listening subband group, and each listening subband group includes at least one listening subband, where the second bandwidth value is greater than the first bandwidth value.

Optionally, in a case that the bandwidth is greater than the first bandwidth value and less than a third bandwidth value, the resource allocation indication is used to indicate M listening subbands allocated to the terminal, and M pieces of indication content are each used to indicate a frequency domain resource allocated to the terminal in one listening subband;

or in a case that the bandwidth is greater than or equal to the third bandwidth value, the resource allocation indication is used to indicate M listening subbands allocated to the terminal, and one piece of indication content is used to indicate frequency domain resources allocated to the terminal in the M listening subbands; or the resource allocation indication is used to indicate N listening subband groups allocated to the terminal, N pieces of indication content are each used to indicate a frequency domain resource allocated to the terminal in one listening subband group, and each listening subband group includes at least one listening subband; where the third bandwidth value is greater than the first bandwidth value.

Optionally, an indication manner of the resource allocation indication is configured by using signaling.

The terminal can improve resource allocation accuracy.

It should be understood that in some embodiments of the present disclosure, the radio frequency unit 801 may be configured to: receive and send signals in an information receiving/sending process or a call process; and specifically, after receiving downlink data from a base station, send the downlink data to the processor 810 for processing, and in addition, send uplink data to the base station. Generally, the radio frequency unit 801 includes but is not limited to an antenna, at least one amplifier, a transceiver, a coupler, a low noise amplifier, a duplexer, and the like. In addition, the radio frequency unit 801 may further communicate with a network and another device through a wireless communications system.

The terminal provides wireless broadband Internet access for a user by using the network module 802, for example, helps the user send and receive e-mails, browse web pages, and access streaming media.

The audio output unit 803 may convert audio data received by the radio frequency unit 801 or the network module 802 or stored in the memory 809 into an audio signal, and output the audio signal as a sound. In addition, the audio output unit 803 may further provide an audio output (for example, a call signal received sound or a message received sound) related to a specific function performed by the terminal 800. The audio output unit 803 includes a speaker, a buzzer, a phone receiver, and the like.

The input unit 804 is configured to receive an audio or video signal. The input unit 804 may include a graphics processing unit ( ) 8041 and a microphone 8042. The graphics processing unit 8041 processes image data of a still picture or a video obtained by an image capture apparatus (for example, a camera) in an image capture mode or a video capture mode. A processed image frame may be displayed on the display unit 806. An image frame processed by the graphics processing unit 8041 may be stored in the memory 809 (or another storage medium) or sent by the radio frequency unit 801 or the network module 802. The microphone 8042 can receive a sound and can process the sound into audio data. The processed audio data can be converted in a telephone call mode into a format that can be sent to a mobile communications base station through the radio frequency unit 801, for outputting.

The terminal 800 further includes at least one sensor 805, for example, an optical sensor, a motion sensor, and another sensor. Specifically, the optical sensor includes an ambient light sensor and a proximity sensor. The ambient light sensor may adjust luminance of a display panel 8061 based on brightness of ambient light. The proximity sensor may turn off the display panel 8061 and/or backlight when the terminal 800 moves to an ear. As a type of motion sensor, an accelerometer sensor can detect magnitudes of accelerations in all directions (usually three axes), can detect a magnitude and a direction of gravity when the terminal is in a stationary state, and can be applied to terminal posture recognition (such as screen switching between portrait and landscape, related games, and magnetometer posture calibration), functions related to vibration recognition (such as pedometer and tapping), and the like. The sensor 805 may further include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information input by the user or information provided for the user. The display unit 806 may include the display panel 8061. The display panel 8061 may be configured in a form of a liquid crystal display (LCD), an organic light-emitting diode (OLED), or the like.

The user input unit 807 may be configured to receive input digit or character information, and generate a key signal input related to a user setting and function control of the terminal. Specifically, the user input unit 807 includes a touch panel 8071 and other input devices 8072. The touch panel 8071, also referred to as a touchscreen, may capture a touch operation performed by the user on or near the touch panel (for example, an operation performed by the user on the touch panel 8071 or near the touch panel 8071 by using any appropriate object or accessory such as a finger or a stylus). The touch panel 8071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 810, and receives and executes a command sent by the processor 810. In addition, the touch panel 8071 may be implemented in a plurality of forms, for example, a resistive, capacitive, infrared, or surface acoustic wave touch panel. The user input unit 807 may further include the other input devices 8072 in addition to the touch panel 8071. Specifically, the other input devices 8072 may include but are not limited to a physical keyboard, a function key (such as a volume control key or a power on/off key), a trackball, a mouse, a joystick, and the like. Details are not described herein.

Further, the touch panel 8071 may cover the display panel 8061. After the touch panel 8071 detects a touch operation on or near the touch panel, the touch panel 8071 transmits the touch operation to the processor 810 to determine a type of a touch event. Then the processor 810 provides a corresponding visual output on the display panel 8061 based on the type of the touch event. Although the touch panel 8071 and the display panel 8061 are used as two separate components to implement input and output functions of the terminal in FIG. 8, the touch panel 8071 and the display panel 8061 may be integrated to implement the input and output functions of the terminal in some embodiments. This is not specifically limited herein.

The interface unit 808 is an interface for connecting an external apparatus to the terminal 800. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 808 may be configured to receive an input (for example, data information or power) from an external apparatus, and transmit the received input to one or more components in the terminal 800, or may be configured to transmit data between the terminal 800 and an external apparatus.

The memory 809 may be configured to store a software program and various data. The memory 809 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 809 may include a high-speed random access memory, or may include a non-volatile memory, for example, at least one magnetic disk storage device, a flash memory, or other non-volatile solid-state storage devices.

The processor 810 is a control center of the terminal. The processor 810 uses various interfaces and lines to connect all parts of the entire terminal, and performs various functions and data processing of the terminal by running or executing the software program and/or module stored in the memory 809 and invoking data stored in the memory 809, thereby performing overall monitoring on the terminal. The processor 810 may include one or more processing units. Optionally, the processor 810 may integrate an application processor and a modem processor. The application processor mainly processes the operating system, a user interface, an application program, and the like. The modem processor mainly processes wireless communication. It may be understood that the modem processor may alternatively not be integrated into the processor 810.

The terminal 800 may further include the power supply 811 (for example, a battery) supplying power to all components. Optionally, the power supply 811 may be logically connected to the processor 810 through a power management system. In this way, functions such as charge management, discharge management, and power consumption management are implemented by using the power management system.

In addition, the terminal 800 includes some functional modules that are not illustrated. Details are not described herein.

Optionally, some embodiments of the present disclosure further provide a terminal, including a processor 810, a memory 809, and a program stored in the memory 809 and capable of running on the processor 810. When the program is executed by the processor 810, each process of the foregoing embodiment of the frequency domain resource allocation method is implemented, with a same technical effect achieved. To avoid repetition, details are not described herein again.

Figure 9:
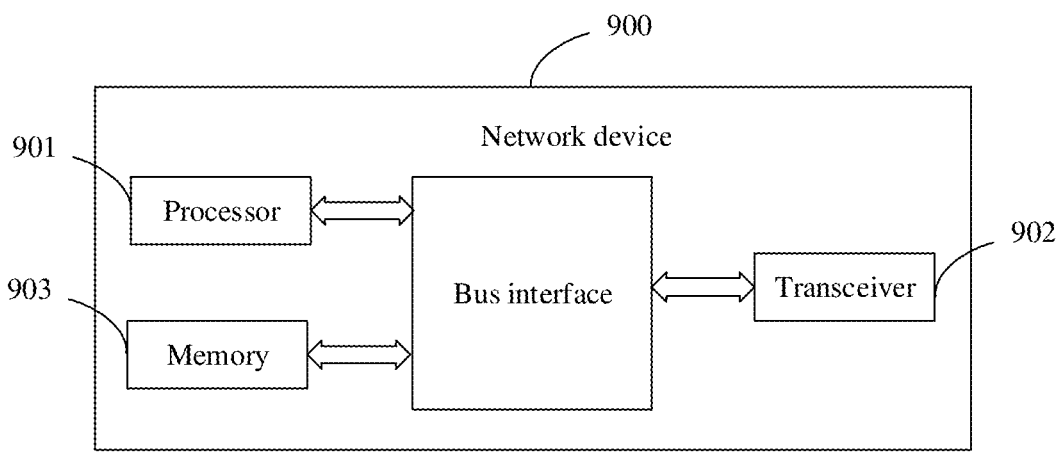
FIG. 9 is another structural diagram of a network device according to some embodiments of the present disclosure.

FIG. 9 is a structural diagram of another network device according to some embodiments of the present disclosure. As shown in FIG. 9, the network device 900 includes a processor 901, a transceiver 902, a memory 903, and a bus interface.

The transceiver 902 is configured to send a resource allocation indication, where the resource allocation indication corresponds to a parameter of a BWP configured for a terminal, and the resource allocation indication is used to indicate a frequency domain resource in the BWP.

Optionally, the frequency domain resource includes an interlace, an RB, or an RBG.

Optionally, in a case that the frequency domain resource includes an interlace, the parameter includes subcarrier spacing.

Optionally, in a case that the subcarrier spacing is a first subcarrier spacing, the resource allocation indication indicates the resource by using a RIV; or
  in a case that the subcarrier spacing is a second subcarrier spacing, the resource allocation indication indicates the resource in a form of a bitmap, where
  the first subcarrier spacing is less than the second subcarrier spacing.

Optionally, the parameter includes bandwidth.

Optionally, in a case that the bandwidth is greater than a first bandwidth value, the resource allocation indication is used to indicate the following content:
  a listening subband allocated to the terminal; and
  a frequency domain resource allocated to the terminal in the listening subband.

Optionally, the resource allocation indication is used to indicate M listening subbands allocated to the terminal, and one piece of indication content is used to indicate frequency domain resources allocated to the terminal in the M listening subbands; or
  the resource allocation indication is used to indicate M listening subbands allocated to the terminal, and M pieces of indication content are each used to indicate a frequency domain resource allocated to the terminal in one listening subband; or
  the resource allocation indication is used to indicate N listening subband groups allocated to the terminal, N pieces of indication content are each used to indicate a frequency domain resource allocated to the terminal in one listening subband group, and each listening subband group includes at least one listening subband, where
  M is an integer greater than or equal to 1, and N is an integer less than or equal to M.

Optionally, in a case that the bandwidth is greater than the first bandwidth value and less than a second bandwidth value,
  the resource allocation indication is used to indicate M listening subbands allocated to the terminal, and one piece of indication content is used to indicate frequency domain resources allocated to the terminal in the M listening subbands;
  or
  in a case that the bandwidth is greater than or equal to the second bandwidth value,
  the resource allocation indication is used to indicate M listening subbands allocated to the terminal, and M pieces of indication content are each used to indicate a frequency domain resource allocated to the terminal in one listening subband; or the resource allocation indication is used to indicate N listening subband groups allocated to the terminal, N pieces of indication content are each used to indicate a frequency domain resource allocated to the terminal in one listening subband group, and each listening subband group includes at least one listening subband, where the second bandwidth value is greater than the first bandwidth value.

Optionally, in a case that the bandwidth is greater than the first bandwidth value and less than a third bandwidth value, the resource allocation indication is used to indicate M listening subbands allocated to the terminal, and M pieces of indication content are each used to indicate a frequency domain resource allocated to the terminal in one listening subband;

or in a case that the bandwidth is greater than or equal to the third bandwidth value, the resource allocation indication is used to indicate M listening subbands allocated to the terminal, and one piece of indication content is used to indicate frequency domain resources allocated to the terminal in the M listening subbands; or the resource allocation indication is used to indicate N listening subband groups allocated to the terminal, N pieces of indication content are each used to indicate a frequency domain resource allocated to the terminal in one listening subband group, and each listening subband group includes at least one listening subband; where the third bandwidth value is greater than the first bandwidth value.

Optionally, an indication manner of the resource allocation indication is configured by using signaling.

The network device can improve resource allocation accuracy.

The transceiver 902 is configured to receive and send data under control of the processor 901. The transceiver 902 includes at least two antenna ports.

In FIG. 9, a bus architecture may include any quantity of interconnect buses and bridges, specifically for interconnecting various circuits of one or more processors represented by the processor 901 and a memory represented by the memory 903. The bus architecture may further interconnect various other circuits such as a peripheral device, a voltage regulator, and a power management circuit. These are all well known in the art, and therefore are not further described in this specification. The bus interface provides an interface. The transceiver 902 may be a plurality of components, that is, the transceiver 902 includes a transmitter and a receiver, and provides a unit for communicating with various other apparatuses on a transmission medium. For different user equipment, the bus interface may also be an interface for externally or internally connecting a required device, and the connected device includes but is not limited to a mini keyboard, a display, a speaker, a microphone, a joystick, or the like.

The processor 901 is responsible for bus architecture management and general processing. The memory 903 may store data used when the processor 901 performs an operation.

Optionally, some embodiments of the present disclosure further provide a network device, including a processor 901, a memory 903, and a program stored in the memory 903 and capable of running on the processor 901. When the program is executed by the processor 901, each process of the foregoing embodiment of the frequency domain resource allocation method is implemented, with a same technical effect achieved. To avoid repetition, details are not described herein again.

Some embodiments of the present disclosure further provide a computer-readable storage medium. The computer-readable storage medium stores a computer program, and when the computer program is executed by a processor, the frequency domain resource allocation method on the terminal side according to some embodiments of the present disclosure is implemented, or when the computer program is executed by a processor, the frequency domain resource allocation method on the network device side according to some embodiments of the present disclosure can be implemented, with a same technical effect achieved. To avoid repetition, details are not described herein again. The computer-readable storage medium is, for example, a read-only memory (Read-Only Memory, ROM for short), a random access memory (Random Access Memory, RAM for short), a magnetic disk, or an optical disc.

It can be understood that the embodiments described in some embodiments of the present disclosure may be implemented by hardware, software, firmware, middleware, microcode, or a combination thereof. For hardware implementation, the module, unit, submodule, subunit, or the like may be implemented in one or more application specific integrated circuits (Application Specific Integrated Circuits, ASIC), digital signal processors (Digital Signal Processing, DSP), digital signal processing devices (DSP Device, DSPD), programmable logic devices (Programmable Logic Device, PLD), field-programmable gate arrays (Field-Programmable Gate Array, FPGA), general-purpose processors, controllers, microcontrollers, microprocessors, and other electronic units for performing the functions described in this application, or a combination thereof.

For software implementation, the techniques described in some embodiments of the present disclosure may be implemented by modules (such as processes and functions) that perform the functions described in some embodiments of the present disclosure. Software code may be stored in the memory and executed by the processor. The memory may be implemented in or outside the processor.

Therefore, an objective of the present disclosure may also be achieved by running a program or a group of programs on any computing apparatus. The computing apparatus may be a well-known general apparatus. Therefore, the objective of the present disclosure may also be achieved by merely providing a program product including program code for implementing the method or apparatus. To be specific, the program product also constitutes the present disclosure, and a storage medium storing the program product also constitutes the present disclosure. Apparently, the storage medium may be any well-known storage medium or any storage medium that will be developed in the future. It should also be noted that in the apparatus and method of the present disclosure, apparently, the components or steps may be decomposed and/or recombined. The decomposition and/or recombination should be considered as an equivalent solution of the present disclosure. In addition, steps for performing the foregoing series of processing may be naturally performed in a sequence of description and in a time sequence, but do not need to be performed necessarily in the time sequence. Some steps may be performed in parallel or separately.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing embodiments, a person skilled in the art may clearly understand that the method in the foregoing embodiments may be implemented by software in addition to a necessary universal hardware platform or by hardware only. In most cases, the former is a more preferred implementation. Based on such an understanding, the technical solutions of the present disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing implementations. The foregoing embodiments are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. A frequency domain resource allocation method, performed by a network device and comprising:
    sending a resource allocation indication, wherein the resource allocation indication corresponds to a parameter of a bandwidth part (BWP) configured for a terminal, and the resource allocation indication is used to indicate a frequency domain resource in the BWP;
    wherein the frequency domain resource comprises an interlace, and the parameter comprises subcarrier spacing and bandwidth;
    wherein in a case that the bandwidth is greater than a first bandwidth value, the resource allocation indication is used to indicate the following content:
        a listening subband allocated to the terminal; and
        the frequency domain resource allocated to the terminal in the listening subband;
    wherein the resource allocation indication is used to indicate M listening subbands allocated to the terminal, and one piece of indication content is used to indicate frequency domain resources allocated to the terminal in the M listening subbands; or
    the resource allocation indication is used to indicate M listening subbands allocated to the terminal, and M pieces of indication content are each used to indicate a frequency domain resource allocated to the terminal in one listening subband; or
    the resource allocation indication is used to indicate N listening subband groups allocated to the terminal, N pieces of indication content are each used to indicate a frequency domain resource allocated to the terminal in one listening subband group, and each listening subband group comprises at least one listening subband, wherein
    M is an integer greater than or equal to 1, and N is an integer less than or equal to M.

2. The method according to claim 1, wherein the frequency domain resource further comprises a resource block (RB) or a resource block group (RBG).

3. The method according to claim 1, wherein in a case that the subcarrier spacing is a first subcarrier spacing, the resource allocation indication indicates the resource by using a resource indication value (RIV); or
    in a case that the subcarrier spacing is a second subcarrier spacing, the resource allocation indication indicates the resource in a form of a bitmap, wherein
    the first subcarrier spacing is less than the second subcarrier spacing.

4. The method according to claim 1, wherein
    in a case that the bandwidth is greater than the first bandwidth value and less than a second bandwidth value,
    the resource allocation indication is used to indicate M listening subbands allocated to the terminal, and one piece of indication content is used to indicate frequency domain resources allocated to the terminal in the M listening subbands;
    or
    in a case that the bandwidth is greater than or equal to the second bandwidth value,
    the resource allocation indication is used to indicate M listening subbands allocated to the terminal, and M pieces of indication content are each used to indicate a frequency domain resource allocated to the terminal in one listening subband; or the resource allocation indication is used to indicate N listening subband groups allocated to the terminal, N pieces of indication content are each used to indicate a frequency domain resource allocated to the terminal in one listening subband group, and each listening subband group comprises at least one listening subband, wherein
    the second bandwidth value is greater than the first bandwidth value.

5. The method according to claim 1, wherein
    in a case that the bandwidth is greater than the first bandwidth value and less than a third bandwidth value,
    the resource allocation indication is used to indicate M listening subbands allocated to the terminal, and M pieces of indication content are each used to indicate a frequency domain resource allocated to the terminal in one listening subband;
    or
    in a case that the bandwidth is greater than or equal to the third bandwidth value,
    the resource allocation indication is used to indicate M listening subbands allocated to the terminal, and one piece of indication content is used to indicate frequency domain resources allocated to the terminal in the M listening subbands; or the resource allocation indication is used to indicate N listening subband groups allocated to the terminal, N pieces of indication content are each used to indicate a frequency domain resource allocated to the terminal in one listening subband group, and each listening subband group comprises at least one listening subband; wherein
    the third bandwidth value is greater than the first bandwidth value.

6. The method according to claim 1, wherein an indication manner of the resource allocation indication is configured by using signaling.

7. The method according to claim 1, wherein the first bandwidth value is configured by the network device, or the first bandwidth value is defined in a protocol, or the first bandwidth value is 20 MHz.

8. A non-transitory computer-readable storage medium, wherein the computer-readable storage medium stores a computer program, and the computer program, when executed by a processor of a network device, implements:
sending a resource allocation indication, wherein the resource allocation indication corresponds to a parameter of a bandwidth part (BWP) configured for a terminal, and the resource allocation indication is used to indicate a frequency domain resource in the BWP;
wherein the frequency domain resource comprises an interlace, and the parameter comprises subcarrier spacing and bandwidth;
wherein in a case that the bandwidth is greater than a first bandwidth value, the resource allocation indication is used to indicate the following content:
a listening subband allocated to the terminal; and
the frequency domain resource allocated to the terminal in the listening subband;
wherein the resource allocation indication is used to indicate M listening subbands allocated to the terminal, and one piece of indication content is used to indicate frequency domain resources allocated to the terminal in the M listening subbands; or
the resource allocation indication is used to indicate M listening subbands allocated to the terminal, and M pieces of indication content are each used to indicate a frequency domain resource allocated to the terminal in one listening subband; or
the resource allocation indication is used to indicate N listening subband groups allocated to the terminal, N pieces of indication content are each used to indicate a frequency domain resource allocated to the terminal in one listening subband group, and each listening subband group comprises at least one listening subband, wherein
M is an integer greater than or equal to 1, and N is an integer less than or equal to M.

9. The storage medium according to claim 8, wherein the frequency domain resource further comprises a resource block (RB) or a resource block group (RBG).

10. The storage medium according to claim 8, wherein in a case that the subcarrier spacing is a first subcarrier spacing, the resource allocation indication indicates the resource by using a resource indication value (RIV); or
in a case that the subcarrier spacing is a second subcarrier spacing, the resource allocation indication indicates the resource in a form of a bitmap, wherein
the first subcarrier spacing is less than the second subcarrier spacing.

11. The storage medium according to claim 8, wherein
in a case that the bandwidth is greater than the first bandwidth value and less than a second bandwidth value,
the resource allocation indication is used to indicate M listening subbands allocated to the terminal, and one piece of indication content is used to indicate frequency domain resources allocated to the terminal in the M listening subbands;
or
in a case that the bandwidth is greater than or equal to the second bandwidth value,
the resource allocation indication is used to indicate M listening subbands allocated to the terminal, and M pieces of indication content are each used to indicate a frequency domain resource allocated to the terminal in one listening subband; or the resource allocation indication is used to indicate N listening subband groups allocated to the terminal, N pieces of indication content are each used to indicate a frequency domain resource allocated to the terminal in one listening subband group, and each listening subband group comprises at least one listening subband, wherein
the second bandwidth value is greater than the first bandwidth value.

12. The storage medium according to claim 8, wherein
in a case that the bandwidth is greater than the first bandwidth value and less than a third bandwidth value,
the resource allocation indication is used to indicate M listening subbands allocated to the terminal, and M pieces of indication content are each used to indicate a frequency domain resource allocated to the terminal in one listening subband;
or
in a case that the bandwidth is greater than or equal to the third bandwidth value,
the resource allocation indication is used to indicate M listening subbands allocated to the terminal, and one piece of indication content is used to indicate frequency domain resources allocated to the terminal in the M listening subbands; or the resource allocation indication is used to indicate N listening subband groups allocated to the terminal, N pieces of indication content are each used to indicate a frequency domain resource allocated to the terminal in one listening subband group, and each listening subband group comprises at least one listening subband; wherein
the third bandwidth value is greater than the first bandwidth value.

13. The storage medium according to claim 8, wherein the first bandwidth value is configured by the network device, or the first bandwidth value is defined in a protocol, or the first bandwidth value is 20 MHz.

14. A non-transitory computer-readable storage medium, wherein the computer-readable storage medium stores a computer program, and the computer program, when executed by a processor of a terminal, implements:
receiving a resource allocation indication, wherein the resource allocation indication corresponds to a parameter of a bandwidth part (BWP) configured for the terminal; and
determining a frequency domain resource indicated by the resource allocation indication in the BWP;
wherein the frequency domain resource comprises an interlace, and the parameter comprises subcarrier spacing and bandwidth;
wherein in a case that the bandwidth is greater than a first bandwidth value, the resource allocation indication is used to indicate the following content:
a listening subband allocated to the terminal; and
the frequency domain resource allocated to the terminal in the listening subband;
wherein the resource allocation indication is used to indicate M listening subbands allocated to the terminal, and one piece of indication content is used to indicate frequency domain resources allocated to the terminal in the M listening subbands; or
the resource allocation indication is used to indicate M listening subbands allocated to the terminal, and M pieces of indication content are each used to indicate a frequency domain resource allocated to the terminal in one listening subband; or the resource allocation indication is used to indicate N listening subband groups allocated to the terminal, N pieces of indication content are each used to indicate a frequency domain resource allocated to the terminal in one listening subband group, and each listening subband group comprises at least one listening subband, wherein M is an integer greater than or equal to 1, and N is an integer less than or equal to M.

15. The storage medium according to claim 14, wherein the frequency domain resource further comprises a resource block (RB) or a resource block group (RBG).

16. The storage medium according to claim 14, wherein in a case that the subcarrier spacing is a first subcarrier spacing, the resource allocation indication indicates the resource by using a resource indication value (RIV); or in a case that the subcarrier spacing is a second subcarrier spacing, the resource allocation indication indicates the resource in a form of a bitmap, wherein the first subcarrier spacing is less than the second subcarrier spacing.

17. The storage medium according to claim 14, wherein in a case that the bandwidth is greater than the first bandwidth value and less than a second bandwidth value, the resource allocation indication is used to indicate M listening subbands allocated to the terminal, and one piece of indication content is used to indicate frequency domain resources allocated to the terminal in the M listening subbands;

or in a case that the bandwidth is greater than or equal to the second bandwidth value, the resource allocation indication is used to indicate M listening subbands allocated to the terminal, and M pieces of indication content are each used to indicate a frequency domain resource allocated to the terminal in one listening subband; or the resource allocation indication is used to indicate N listening subband groups allocated to the terminal, N pieces of indication content are each used to indicate a frequency domain resource allocated to the terminal in one listening subband group, and each listening subband group comprises at least one listening subband, wherein the second bandwidth value is greater than the first bandwidth value.

18. The storage medium according to claim 14, wherein in a case that the bandwidth is greater than the first bandwidth value and less than a third bandwidth value, the resource allocation indication is used to indicate M listening subbands allocated to the terminal, and M pieces of indication content are each used to indicate a frequency domain resource allocated to the terminal in one listening subband;

or in a case that the bandwidth is greater than or equal to the third bandwidth value, the resource allocation indication is used to indicate M listening subbands allocated to the terminal, and one piece of indication content is used to indicate frequency domain resources allocated to the terminal in the M listening subbands; or the resource allocation indication is used to indicate N listening subband groups allocated to the terminal, N pieces of indication content are each used to indicate a frequency domain resource allocated to the terminal in one listening subband group, and each listening subband group comprises at least one listening subband; wherein the third bandwidth value is greater than the first bandwidth value.

19. The storage medium according to claim 14, wherein an indication manner of the resource allocation indication is configured by using signaling.

20. The storage medium according to claim 14, wherein the first bandwidth value is configured by the network device, or the first bandwidth value is defined in a protocol, or the first bandwidth value is 20 MHz.

* * * * *